United States Patent
Hu et al.

(10) Patent No.: US 12,116,313 B1
(45) Date of Patent: Oct. 15, 2024

(54) NON-SINTERED HIGH-STRENGTH LIGHTWEIGHT AGGREGATE ONE-SHOT PREPARED FROM SULFUR-BASED AND ALKALINE-BASED SOLID WASTES BY STIRRING, GRANULATION, FOAMING, PREPARATION METHOD THEREFOR AND USE THEREOF

(71) Applicants: SHANDONG UNIVERSITY, Shandong (CN); HUBEI CHANGYAO NEW MATERIALS CO., LTD., Hubei (CN)

(72) Inventors: Zhijuan Hu, Jinan (CN); Chao Zhang, Jinan (CN); Chiqiu Wu, Yichang (CN); Wenlong Wang, Jinan (CN); Wei Lv, Yichang (CN); Xujiang Wang, Jinan (CN); Yuzhong Li, Jinan (CN)

(73) Assignees: SHANDONG UNIVERSITY, Shandong (CN); HUBEI CHANGYAO NEW MATERIALS CO., LTD., Hubei (CN)

( * ) Notice: Subject to any disclaimer, the term of this patent is extended or adjusted under 35 U.S.C. 154(b) by 0 days.

(21) Appl. No.: 18/682,025

(22) PCT Filed: Jun. 7, 2023

(86) PCT No.: PCT/CN2023/098961
§ 371 (c)(1),
(2) Date: Feb. 7, 2024

(51) Int. Cl.
*C04B 28/14* (2006.01)
*C04B 18/02* (2006.01)
*C04B 18/04* (2006.01)
*C04B 20/00* (2006.01)
*C04B 38/02* (2006.01)
*C04B 38/04* (2006.01)
*C04B 40/00* (2006.01)
*C04B 40/02* (2006.01)
*C04B 111/40* (2006.01)

(52) U.S. Cl.
CPC .......... *C04B 18/027* (2013.01); *C04B 18/021* (2013.01); *C04B 18/0409* (2013.01); *C04B 18/0481* (2013.01); *C04B 20/004* (2013.01); *C04B 38/02* (2013.01); *C04B 38/04* (2013.01); *C04B 40/0057* (2013.01); *C04B 2111/40* (2013.01); *C04B 2201/20* (2013.01)

(58) Field of Classification Search
CPC . C04B 18/027; C04B 18/021; C04B 18/0409; C04B 18/0481; C04B 20/004; C04B 38/02; C04B 38/04; C04B 40/0057; C04B 2111/40; C04B 2201/20; C04B 28/14; C04B 40/02; C04B 18/04; C04B 18/0445; C04B 18/064; C04B 18/067; C04B 18/08; Y02W 30/91
See application file for complete search history.

(56) References Cited

FOREIGN PATENT DOCUMENTS

| CN | 108623278 A | 10/2018 |
| CN | 109020418 A | 12/2018 |
| CN | 111362608 A | 7/2020 |
| CN | 112661426 A | 4/2021 |
| CN | 112723764 A | 4/2021 |
| CN | 112777973 A | 5/2021 |
| CN | 113149586 A | 7/2021 |
| CN | 113698117 A | 11/2021 |
| CN | 115140959 A | 10/2022 |
| CN | 115368041 A | 11/2022 |
| CN | 115368043 A | * 11/2022 |
| CN | 115626787 A | 1/2023 |
| CN | 116003092 A | 4/2023 |
| KR | 10-2009-0068092 A | 6/2009 |
| KR | 10-2010-0079647 A | 7/2010 |
| WO | 2022/142136 A1 | 7/2022 |

OTHER PUBLICATIONS

CN-115368043-A, machine translation (Year: 2022).*
May 4, 2023 Office Action issued in Chinese Patent Application No. 202310301719.8.
May 22, 2023 Notification to Grant Patent Right for Invention issued in Chinese Patent Application No. 202310301719.8.
Dec. 26, 2023 International Search Report issued in International Patent Application No. PCT/CN2023/098961.
Dec. 26, 2023 Written Opinion of the International Searching Authority issued in International Patent Application No. PCT/CN2023/098961.

* cited by examiner

*Primary Examiner* — Anthony J Green
*Assistant Examiner* — Marites A Guino-O Uzzle
(74) *Attorney, Agent, or Firm* — Oliff PLC

(57) ABSTRACT

A non-sintered high-strength lightweight aggregate one-shot prepared from sulfur-based and alkaline-based solid wastes by stirring, granulation, and foaming, and a preparation method therefor and use thereof. The non-sintered high-strength lightweight aggregate is prepared from a sulfur-based solid waste, an alkaline-based solid waste, an auxiliary cementing material, a ferro-aluminum-sulfur cementing material, water, and a foaming agent as raw materials. Based on the mass of the total solid, the total content of the sulfur-based solid waste, the alkaline-based solid waste, and the auxiliary cementing material is 80-90 wt %, and the content of the ferro-aluminum-sulfur cementing material is 10-20 wt %. The mass ratio of the water to the total solid is (15-20):(80-85). The foaming agent accounts for 0.3-0.7% of the mass of the total solid. The mass ratio between the sulfur-based solid waste, the alkaline-based solid waste, and the auxiliary cementing material is (27-33):(27-33):(18-25).

8 Claims, No Drawings

NON-SINTERED HIGH-STRENGTH LIGHTWEIGHT AGGREGATE ONE-SHOT PREPARED FROM SULFUR-BASED AND ALKALINE-BASED SOLID WASTES BY STIRRING, GRANULATION, FOAMING, PREPARATION METHOD THEREFOR AND USE THEREOF

The present disclosure claims priority to Chinese Patent Application No 202310301719.8, filed with the China National Intellectual Property Administration on Mar. 27, 2023 and entitled "NON-SINTERED HIGH-STRENGTH LIGHTWEIGHT AGGREGATE ONE-SHOT PREPARED FROM SULFUR-BASED AND ALKALINE-BASED SOLID WASTES BY STIRRING, GRANULATION, FOAMING, PREPARATION METHOD THEREFOR AND USE THEREOF", which is incorporated herein by reference in its entirety.

TECHNICAL FIELD

The present disclosure relates to the technical field of building materials, particularly to the high-value utilization of sulfur-based and alkaline-based solid wastes as resources, and more particularly to a non-sintered high-strength lightweight aggregate one-shot prepared from sulfur-based and alkaline-based solid wastes by stirring, granulation, and foaming, and a preparation method therefor and use thereof.

BACKGROUND

The annual output and the storage of sulfur-based solid wastes such as desulfurized gypsum, phosphogypsum and titanium gypsum and alkaline waste residues such as red mud and steel slag are large in China, but the utilization rate of such wastes as high-value resources is low. The development of green building materials with multiple features such as light weight, high strength, energy conservation, heat preservation and the like has become an important focus of industrial attention. Different from traditional sandstone aggregates, lightweight aggregates with high strength and excellent construction properties can be used in buildings and traffic facilities in the place of natural aggregates.

At present, most lightweight aggregates are prepared from sintering of shale or other natural raw materials, with high energy consumption, high carbon emission, and high natural resource consumption. Some lightweight aggregates are prepared from sintering of solid wastes, with a series of problems such as low homogenization of solid wastes, significant fluctuations in the sintering system, poor product stability, and inapplicability to load-bearing structures. In recent years, some scholars have proposed methods for preparing a non-sintered lightweight aggregate without requiring sintering. Compared with conventional sintering methods, such methods not requiring sintering have the advantages of energy conservation, environmental protection, low cost and the like. However, existing processes for preparing a non-sintered lightweight aggregate mostly use a roller and a disc granulator for secondary granulation and require pretreatment of raw materials before granulation, making the process complex and the product quality uncontrollable. Mostly, ordinary silicate cement with high energy consumption and high $CO_2$ emission are used as the binding materials. To improve the strength of the lightweight aggregate, a variety of additives need to be added, increasing the production costs.

SUMMARY

To overcome the defects in the prior art, an objective of the present disclosure is to provide a non-sintered high-strength lightweight aggregate one-shot prepared from sulfur-based and alkaline-based solid wastes by stirring, granulation, and foaming. The lightweight aggregate has the advantages of high strength, readily available raw materials, simple preparation process, and not requiring high-temperature sintering and steam curing, and overcomes the defects in the prior art of low utilization rate of solid wastes, the necessity of pretreatment of raw materials before granulation, poor controllability of product quality, high energy consumption, high $CO_2$ emission, high costs and the like.

To achieve the objective, the present disclosure adopts the following technical solutions. A first aspect of the present disclosure provides a non-sintered high-strength lightweight aggregate one-shot prepared from sulfur-based and alkaline-based solid wastes by stirring, granulation, and foaming, including a sulfur-based solid waste, an alkaline-based solid waste, an auxiliary cementing material, a ferro-aluminum-sulfur cementing material, water, and a foaming agent. Based on the mass of the total solid, the total content of the sulfur-based solid waste, the alkaline-based solid waste, and the auxiliary cementing material in percentage by mass is 80%-90%, and the content of the ferro-aluminum-sulfur cementing material in percentage by mass is 10%-20%. The mass ratio of the water to the total solid is (15-20):(80-85). The foaming agent accounts for 0.3%-0.7% of the mass of the total solid.

The mass ratio between the sulfur-based solid waste, the alkaline-based solid waste, and the auxiliary cementing material is (27-33):(27-33):(18-25).

The mass of the total solid is the total mass of the sulfur-based solid waste, the alkaline-based solid waste, the auxiliary cementing material, and the ferro-aluminum-sulfur cementing material.

The present disclosure provides a way for high efficiently utilizing sulfur-based and alkaline-based solid wastes. With the use of the sulfur-based and alkaline-based solid wastes as main raw materials in combination with the ferro-aluminum-sulfur cementing material and the foaming agent, the high-value utilization of solid wastes as resources is realized, thereby solving the problems of long-term stockpiling of a large amount of solid wastes which are difficult to treat and the consequent impact on the environment, and greatly improving the excellent performance of the solid wastes as the lightweight aggregate. The non-sintered high-strength lightweight aggregate has a low bulk density, a higher mechanical strength than that of a high-temperature sintered ceramsite lightweight aggregate, and can be widely used in products such as premixed lightweight aggregate concrete, lightweight concrete blocks, wallboard products and the like.

More specifically, the present disclosure uses an alkaline-based solid waste (such as red mud, steel slag, an alkaline residue and the like) and a sulfur-based solid waste (such as phosphogypsum, desulfurized gypsum and the like) as raw materials, an alkali in the alkaline-based solid waste can dissolve out active Si—Al structures in the auxiliary cementing material and the cementing material, and the active Si—Al structures can be hydrated to form a C(N)-A-S-H gel in the presence of $Ca^{2+}/Na^+$. A large amount of $Ca^{2+}$ and $SO_4^{2-}$ can dissolve out of the phosphogypsum. Under the alkaline condition, $SO_4^{2-}$ can induce the hydration of the auxiliary cementing material and the cementing material to form ettringite. Therefore, the synergy of the two solid wastes can realize the synergy of minerals formed by hydration. The C(N)-A-S-H gel and the ettringite generated by hydration jointly improve the strength performance of the non-sintered lightweight aggregate.

Preferably, the sulfur-based solid waste includes desulfurized gypsum, phosphogypsum, and titanium gypsum; and the sulfur-based solid waste has a $SO_3$ content of higher than or equal to 40 wt % and an average particle size of less than or equal to 50 μm. The sulfur-based solid waste can provide a large amount of $SO_4^{2-}$ for hydration in the system. The $SO_4^{2-}$ can motivate the reaction of the auxiliary cementing material and the cementing material to form ettringite, providing the strength of the non-sintered lightweight aggregate in the early stage.

Preferably, the alkaline-based solid waste includes red mud, a steel slag, and an alkaline residue; and a leaching solution of the alkaline-based solid waste has a pH of higher than 10 and an average particle size of less than or equal to 50 μm. The alkaline-based solid waste provides an alkaline environment and alkali metal ions ($Na^+$/$Ca^{2+}$) for hydration in the system. The alkaline environment is conducive to the dissolution of active Si—Al structures in the system, and the alkali metal ions can react with active Si—Al to form the C(N)-A-S-H gel. Therefore, the strength of the non-sintered lightweight aggregate in the later stage can be increased.

Preferably, the auxiliary cementing material mainly includes CaO, $SiO_2$, and $Al_2O_3$, and includes mineral slag powder, fly ash, and silica fume.

Preferably, in the ferro-aluminum-sulfur cementing material, the content of CaO is lower than 40 wt %, the content of $Fe_2O_3$ is higher than 5 wt %, and the content of $SO_3$ is lower than 15 wt %. The ferro-aluminum-sulfur cementing material is hydrated to form ettringite and a Fe-containing gel, which provide the basic strength for the non-sintered lightweight aggregate product.

Preferably, the foaming agent includes $H_2O_2$. A suitable foaming agent is selected according to the alkalinity of the system. Further, the foaming agent is preferably $H_2O_2$.

A second aspect of the present disclosure provides a method for preparing the non-sintered high-strength lightweight aggregate one-shot prepared from sulfur-based and alkaline-based solid wastes by stirring, granulation, and foaming, including:

step one: stirring and uniformly mixing the sulfur-based solid waste, the alkaline-based solid waste, the auxiliary cementing material, and the ferro-aluminum-sulfur cementing material, adding the foaming agent and the water, and stirring and granulating the mixture to obtain lightweight aggregate spheres; and step two: curing the lightweight aggregate spheres and screening the cured lightweight aggregate spheres to obtain the non-sintered high-strength lightweight aggregate.

Preferably, step one, the sulfur-based solid waste, the alkaline-based solid waste, the auxiliary cementing material, and the ferro-aluminum-sulfur cementing material are mixed in a stirring granulator. In the stirring granulator, a cylinder and a stirring shaft can independently and jointly rotate, a maximum speed of the stirring shaft is 150 r/min, corresponding to a torque of 480 N·m, the motor frequency is 50 Hz, and the linear speed of the cylinder wall is 0.5-1.0 m/s.

Preferably, in the step one, the first stirring is high-speed stirring performed at 50 Hz (corresponding to a torque of 480 N·m) for 1-5 min; and the second stirring is medium-speed stirring performed at 25 Hz (corresponding to a torque of 960 N·m) for 5-25 min.

Preferably, the particle size of the lightweight aggregate spheres is 1-20 mm.

Preferably, the curing includes: curing at a temperature of 25-35° C. and a humidity of 92%-98% for 0-5 days, followed by natural curing for 1-5 days with the lightweight aggregate spheres being regularly sprayed with water and slightly turned over once every day. The cured lightweight aggregate spheres are screened and graded, and stored based on the grades. After curing for 1 day, the strength of the lightweight aggregate is higher than 4 MPa. After curing for 7 days, the lightweight aggregate has a bulk density of 600-1,000 kg/m³, a strength of higher than 10 MPa, a water absorption rate of less than 10%, and a softening coefficient of greater than or equal to 0.85.

As a preferred technical solution of the present disclosure, the method for preparing the non-sintered high-strength lightweight aggregate one-shot prepared from sulfur-based and alkaline-based solid wastes by stirring, granulation, and foaming includes:

step one: adding the sulfur-based solid waste, the alkaline-based solid waste, the auxiliary cementing material, and the ferro-aluminum-sulfur cementing material into the stirring granulator at a ratio, stirring at 50 Hz (corresponding to a torque of 480 N·m) for 1-5 min to give a uniform mixture, adding the foaming agent and the water, stirring at 25 Hz (corresponding to a torque of 960 N·m) for 5-25 min, and granulating the resultant mixture to obtain lightweight aggregate spheres with a particle size of 1-20 mm; and step two: curing the lightweight aggregate spheres, including curing at a temperature of 25-35° C. and a humidity of 92%-98% for 0-5 days followed by natural curing same for 1-5 days with the lightweight aggregate spheres being regularly sprayed with water and slightly turned over once every day; and screening the cured lightweight aggregate spheres to obtain the non-sintered high-strength lightweight aggregate.

The non-sintered high-strength lightweight aggregate of the present disclosure has the advantages of light weight and high strength, and can be widely used in prefabricated components such as building external walls, floor slabs, stairs and the like, building beams and columns cast in situ, road surfaces and other scenarios. Therefore, a third aspect of the present disclosure provides use of the non-sintered high-strength lightweight aggregate one-shot prepared from sulfur-based and alkaline-based solid wastes by stirring, granulation, and foaming in a building material.

One or more examples of the present disclosure have the following beneficial effects:

In the present disclosure, sulfur-based and alkaline-based solid wastes are used as raw materials to prepare a non-sintered high-strength lightweight aggregate, thereby achieving the synergistic effect and high-value utilization of solid wastes as resources. The present disclosure features high utilization rate and low production costs, well solves the problems of long-term stockpiling of a large amount of solid wastes which are difficult to treat and the consequent impact on the environment, and reduces the consumption of natural resources.

In the present disclosure, the lightweight aggregate is prepared without sintering by integrating the strong stirring, continuous granulation, and foaming of sulfur-based and alkaline-based solid wastes. Therefore, the prepared lightweight aggregate has a homogeneous composition and stable product performance, and the process is simple, efficient, and energy saving with low carbon emission.

The non-sintered high-strength lightweight aggregate prepared by the present disclosure has a low bulk density of 600-1,000 kg/m³, a high strength of higher than or equal to 10 MPa, a water absorption rate of less than 10%, and a softening coefficient of greater than or equal to 0.85. The product performance is much superior to criteria specified in lightweight aggregate product performance standards (GB/T 17431.1-2010 Lightweight aggregates and its test methods—Part 1: Lightweight aggregates).

DETAILED DESCRIPTION

To facilitate understanding of the present disclosure, the following examples are set forth in the present disclosure. Those skilled in the art should understand that the examples only help understand the present disclosure and should not be construed as specific limitations to the present disclosure.

In the following examples and comparative examples, the sulfur-based solid waste used had a $SO_2$ content of 42.67% and an average particle size of less than or equal to 50 μm; a leaching solution of the alkaline-based solid waste had a pH of 11.5 and the alkaline-based solid waste had an average particle size of less than or equal to 50 μm; the ferro-aluminum-sulfur cementing material was a phosphogypsum-based cementing material, wherein the content of CaO was 34.79%, the content of $Fe_2O_3$ was 9.32%, and the content of SO; was 13.60%; and the foaming agent was $H_2O_2$.

In the following examples, the obtained non-sintered high-strength lightweight aggregate one-shot prepared from sulfur-based and alkaline-based solid wastes by stirring, granulation, and foaming had a 28 d cylindrical compress strength of higher than or equal to 10 MPa and a bulk density of less than 1,000 kg/m³. But the lightweight aggregates for the comparative examples failed to reach the 28 d cylindrical compress strength of higher than or equal to 10 MPa and the bulk density of less than 1,000 kg/m³ at the same time.

Example 1

A method for preparing a non-sintered high-strength lightweight aggregate one-shot prepared from sulfur-based and alkaline-based solid wastes by stirring, granulation, and foaming was provided, including the following steps.

In step one, 82 wt % of phosphogypsum, red mud, and mineral slag powder at a mass ratio of 30:30:22 and 18 wt % of a phosphogypsum-based cementing material were used as raw materials and strongly stirred and premixed in a stirring granulator at a high speed (50 Hz) for 3 min.

In step two, 16 wt % of water containing 0.5% of $H_2O_2$ was uniformly added and the mixture was stirred at a medium speed (25 Hz) for 6 min.

In step three, the cylinder of the stirring granulator was turned over to discharge the obtained lightweight aggregate spheres to a container;

In step four, the discharged lightweight aggregate spheres were screened.

In step five, the screened lightweight aggregate spheres were transferred into a curing room for curing. The curing includes: curing at a temperature of 28° C. and a humidity of 98% for 1 day, followed by natural curing for 3 days with the lightweight aggregate spheres being regularly sprayed with water and slightly turned over once every day.

The non-sintered high-strength lightweight aggregate product one-shot prepared from sulfur-based and alkaline-based solid wastes by stirring, granulation, and foaming in this example had a 1 d cylindrical compress strength of 4.2 MPa, the 7 d cylindrical compress strength of 6.0 MPa, the 28 d cylindrical compress strength of 10.5 MPa, a bulk density of 780 kg/m³, a water absorption rate of 9.5%, and a softening coefficient of 0.86.

Example 2

A method for preparing a non-sintered high-strength lightweight aggregate one-shot prepared from sulfur-based and alkaline-based solid wastes by stirring, granulation, and foaming was provided, which was different from Example 1 in that the phosphogypsum was replaced by desulfurized gypsum.

The non-sintered high-strength lightweight aggregate product one-shot prepared from sulfur-based and alkaline-based solid wastes by stirring, granulation, and foaming in this example had a 1 d cylindrical compress strength of 4.5 MPa, a 7 d cylindrical compress strength of 6.8 MPa, a 28 d cylindrical compress strength of 11.2 MPa, a bulk density of 950 kg/m³, a water absorption rate of 7.5%, and a softening coefficient of 0.88.

The strength and bulk density of the non-sintered lightweight aggregate prepared using desulfurized gypsum in this example were both slightly higher than those of the lightweight aggregate prepared using phosphogypsum (i.e., the lightweight aggregate prepared in Example 1). This may be due to the effect of phosphorus in phosphogypsum.

Example 3

A method for preparing a non-sintered high-strength lightweight aggregate one-shot prepared from sulfur-based and alkaline-based solid wastes by stirring, granulation, and foaming was provided, which was different from that in Example 1 in that the red mud was replaced by acetylene sludge.

The non-sintered high-strength lightweight aggregate product one-shot prepared from sulfur-based and alkaline-based solid wastes by stirring, granulation, and foaming in this example had a 1 d cylindrical compress strength of 4.3 MPa, a 7 d cylindrical compress strength of 6.5 MPa, a 28 d cylindrical compress strength of 10.8 MPa, a bulk density of 930 kg/m³, a water absorption rate of 6.5%, and a softening coefficient of 0.89.

Comparative Example 1

A method for preparing a non-sintered high-strength lightweight aggregate one-shot prepared from sulfur-based and alkaline-based solid wastes by stirring, granulation, and foaming was provided, which was different from Example 1 in that: in step one, 85 wt % of phosphogypsum, red mud, and mineral slag powder, and 15 wt % of a phosphogypsum-based cementing material were used as raw materials, and no foaming agent was added.

The non-sintered high-strength lightweight aggregate product one-shot prepared from sulfur-based and alkaline-based solid wastes by stirring, granulation, and foaming in this example had a 3 d cylindrical compress strength of 6.0 MPa, a 7 dcylindrical compress strength of 9.3 MPa, a 28 dcylindrical compress strength of 14.8 MPa, a bulk density of 1,100 kg/m³, a water absorption rate of 3.8%, and a softening coefficient of 0.96.

The increase in the cylindrical compress strength and bulk density were due to the following two reasons: (1) The alkali-sulfur double excitation effect was enhanced by increasing the amount of alkaline-based and sulfur-based solid wastes added, the hydration reaction took place more thoroughly, thereby increasing the mineral content in the system and improving the strength performance. (2) The non-sintered lightweight aggregate product prepared without using the foaming agent had no pore structures distributed therein, and therefore had a more compact structure with increased strength performance and bulk density.

Comparative Example 2

A method for preparing a non-sintered high-strength lightweight aggregate one-shot prepared from a sulfur-based solid waste by stirring, granulation, and foaming was provided, which was different from Example 1 in that: the red mud component was all replaced by phosphogypsum.

The sulfur-based solid waste stirred, granulated, foamed and once-formed non-sintered high-strength lightweight aggregate product in this example had a 3 d cylindrical compress strength of 3.5 MPa, a 7 d cylindrical compress strength of 4.8 MPa, a 28 d cylindrical compress strength of 8.5 MPa, a bulk density of 830 kg/m$^3$, a water absorption rate of 6.9%, and a softening coefficient of 0.83.

Comparative Example 3

A method for preparing a non-sintered high-strength lightweight aggregate one-shot prepared from an alkaline-based solid waste by stirring, granulation, and foaming was provided, which was different from Example 1 in that: the phosphogypsum component was all replaced by red mud.

The alkaline-based solid waste stirred, granulated, foamed and once-formed non-sintered high-strength lightweight aggregate product in this example had a cylindrical compress strength of 9.1 MPa, a bulk density of 890 kg/m$^3$, a water absorption rate of 10.9%, and a softening coefficient of 0.83.

Comparative Example 4

A method for preparing a non-sintered high-strength lightweight aggregate one-shot from sulfur-based and alkaline-based solid wastes was provided, which was different from Example 1 in that: a disc granulator was used for granulation and the process integrating stirring and granulation was not used.

The non-sintered high-strength lightweight aggregate product in the example had a 3 d cylindrical compress strength of 3.1 MPa, a 7 d cylindrical compress strength of 4.9 MPa, a 28 d cylindrical compress strength of 7.6 MPa, a bulk density of 900 kg/m$^3$, a water absorption rate of 10.3%, and a softening coefficient of 0.80.

It should be understood that although the detailed process equipment and process flow of the present disclosure are illustrated through the above examples, the present disclosure is not limited thereto, i.e., it is not intended that the present disclosure must be implemented by relying on the detailed process equipment and process flow. Those skilled in the art should understand that any improvement to the present disclosure, equivalent replacement of the raw materials of the product of the present disclosure, addition of auxiliary components, selection of specific methods and the like shall all fall within the scope of protection of the present disclosure.

What is claimed is:

1. A non-sintered high-strength lightweight aggregate prepared from sulfur-based and alkaline-based solid wastes by stirring, granulation, and foaming, comprising a sulfur-based solid waste, an alkaline-based solid waste, an auxiliary cementing material, a ferro-aluminum-sulfur cementing material, water, and a foaming agent, wherein
   based on the mass of the total solid, the total content of the sulfur-based solid waste, the alkaline-based solid waste, and the auxiliary cementing material in percentage by mass is 80%-90%, and the content of the ferro-aluminum-sulfur cementing material in percentage by mass is 10%-20%;
   the mass ratio of the water to the total solid is (15-20):(80-85);
   the foaming agent accounts for 0.3%-0.7% of the mass of the total solid;
   the mass ratio between the sulfur-based solid waste, the alkaline-based solid waste, and the auxiliary cementing material is (27-33):(27-33):(18-25); and
   a method for preparing the non-sintered high-strength lightweight aggregate prepared from sulfur-based and alkaline-based solid wastes by stirring, granulation, and foaming comprises:
   step one: first stirring and uniformly mixing the sulfur-based solid waste, the alkaline-based solid waste, the auxiliary cementing material, and the ferro-aluminum-sulfur cementing material, adding the foaming agent and the water, and second stirring and granulating the mixture to obtain lightweight aggregate spheres, wherein the sulfur-based solid waste, the alkaline-based solid waste, the auxiliary cementing material, and the ferro-aluminum-sulfur cementing material are mixed in a stirring granulator; the first stirring is high-speed stirring performed at 50 Hz for 1-5 min; and the second stirring is medium-speed stirring performed at 25 Hz for 5-25 min; and
   step two: curing the lightweight aggregate spheres and screening the cured lightweight aggregate spheres to obtain the non-sintered high-strength lightweight aggregate,
   wherein the non-sintered high-strength lightweight aggregate has a 28 d cylindrical compress strength of higher than or equal to 10 MPa and a bulk density of less than 1,000 kg/m$^3$.

2. The non-sintered high-strength lightweight aggregate prepared from sulfur-based and alkaline-based solid wastes by stirring, granulation, and foaming according to claim 1, wherein the sulfur-based solid waste comprises desulfurized gypsum, phosphogypsum, and titanium gypsum; and
   the sulfur-based solid waste has a SO$_3$ content of higher than or equal to 40 wt % and an average particle size of less than or equal to 50 µm.

3. The non-sintered high-strength lightweight aggregate prepared from sulfur-based and alkaline-based solid wastes by stirring, granulation, and foaming according to claim 1, wherein the alkaline-based solid waste comprises red mud, steel slag, and an alkaline residue; and
   a leaching solution of the alkaline-based solid waste has a pH of higher than 10 and an average particle size of less than or equal to 50 µm.

4. The non-sintered high-strength lightweight aggregate prepared from sulfur-based and alkaline-based solid wastes by stirring, granulation, and foaming according to claim 1, wherein the auxiliary cementing material comprises mineral waste powder, fly ash, and silica fume; or
   the ferro-aluminum-sulfur cementing material comprises a phosphogypsum-based cementing material, wherein in the ferro-aluminum-sulfur cementing material, the content of CaO is lower than 40 wt %, the content of $Fe_2O_3$ is higher than 5 wt %, and the content of $SO_3$ is lower than 15 wt %.

5. The non-sintered high-strength lightweight aggregate prepared from sulfur-based and alkaline-based solid wastes by stirring, granulation, and foaming according to claim 1, wherein the foaming agent comprises $H_2O_2$ and aluminum powder.

6. A method for preparing the non-sintered high-strength lightweight aggregate prepared from sulfur-based and alkaline-based solid wastes by stirring, granulation, and foaming according to claim 1, comprising:

step one: stirring and uniformly mixing the sulfur-based solid waste, the alkaline-based solid waste, the auxiliary cementing material, and the ferro-aluminum-sulfur cementing material, adding the foaming agent and the water, and stirring and granulating the mixture to obtain lightweight aggregate spheres, wherein the sulfur-based solid waste, the alkaline-based solid waste, the auxiliary cementing material, and the ferro-aluminum-sulfur cementing material are mixed in a stirring granulator; the first stirring is high-speed stirring performed at 50 Hz for 1-5 min; and the second stirring is medium-speed stirring performed at 25 Hz for 5-25 min; and step two: curing the lightweight aggregate spheres and screening the cured lightweight aggregate spheres to obtain the non-sintered high-strength lightweight aggregate.

7. The method according to claim 6, wherein the particle size of the lightweight aggregate spheres is 1-20 mm.

8. The method according to claim 6, wherein in the step two, the curing comprises: curing at a temperature of 25-35° C. and a humidity of 92%-98% for 0-5 days, followed by natural curing for 1-5 days with the lightweight aggregate spheres being regularly sprayed with water and slightly turned over once every day.

* * * * *